United States Patent [19]

Powell

[11] Patent Number: 4,672,995
[45] Date of Patent: Jun. 16, 1987

[54] REDUNDANT PILOT VALVE CONTROL SYSTEM

[75] Inventor: Walter W. Powell, Sugarland, Tex.

[73] Assignee: Anderson-Greenwood USA, Inc., Houston, Tex.

[21] Appl. No.: 722,698

[22] Filed: Apr. 12, 1985

Related U.S. Application Data

[63] Continuation-in-part of Ser. No. 687,017, Dec. 28, 1984, which is a continuation of Ser. No. 353,876, Mar. 2, 1982, abandoned.

[51] Int. Cl.$^4$ ............................................. F16K 31/38
[52] U.S. Cl. ...................................... 137/489; 251/26
[58] Field of Search ..................... 137/489, 492, 492.5; 251/26, 29, 33

[56] References Cited

U.S. PATENT DOCUMENTS

| 1,830,927 | 11/1931 | Campbell et al. | 251/26 X |
| 3,411,530 | 11/1968 | Powell | 137/475 |
| 3,807,438 | 4/1974 | Posipsek | 137/489 |
| 3,920,040 | 11/1975 | Powell | 137/489 |
| 4,201,362 | 5/1980 | Nishimi et al. | 251/29 |
| 4,402,341 | 9/1983 | Reip | 137/489 |

FOREIGN PATENT DOCUMENTS 702748  1/1954  United Kingdom ................. 251/33

Primary Examiner—Alan Cohan
Assistant Examiner—Stephen M. Hepperle
Attorney, Agent, or Firm—Gunn, Lee & Jackson

[57] ABSTRACT

In the preferred and illustrated embodiment, a safety relief valve, subject to control of redundant pilot valves with a control system, is set forth. A safety relief valve is ordinarily installed in a fail safe circumstance; accordingly, this control system incorporates redundant pilot valves which respond independently of one another having outputs utilized in the control system to trigger operation of the safety relief valve. The control system has, in its preferred form, an elongate body mounting redundant pilot valves on common manifold passages. If any pilot valve forms a signal requiring operation of the safety relief valve, that signal for the safety relief valve adjusts the setting of the safety relief valve.

19 Claims, 5 Drawing Figures

REDUNDANT PILOT VALVE CONTROL SYSTEM

BACKGROUND OF THE DISCLOSURE

This disclosure is a continuation-in-part of Ser. No. 06/687,017, filed Dec. 28, 1984, which is a continuation application of Ser. No. 06/353,876 filed Mar. 2, 1982, now abandoned.

Competitive valves, and more particularly valve control systems for safety relief valves utilizing redundant pilot valves have heretofore required a relatively complex manifolding of the outputs of the pilot valves. For example, duplicate pilot valves can be connected so that one triggers operation of a third valve to block off the operation of the second pilot valve. On failure of the first pilot valve, the third valve is then operated, enabling the second pilot valve to be connected directly to the safety relief valve. This kind of arrangement is ordinarily accomplished with a somewhat complex manifold system. The manifold system is ordinarily expensive, requiring more hand labor than ordinarily is desired.

Another approach is to place two inlet lines on a safety relief valve. Either line can provide an operative signal. Each line is equipped with a check valve. Should both operate, they will operate more or less synchronously. They will both provide fluid signals to the safety relief valve for its operation. Moreover, if one were to fail and drop the pressure to zero, the check valve would prevent that change from altering the operative state of the safety relief valve. However, control signals provided to a safety relief valve from the operative pilot valve are not simply binary signals. Because of this, the check valves must be bypassed with carefully adjusted chokes which have a controllable rate of flow. It is difficult to set such chokes at a rate of flow which is sufficient to take the redundant pilot valve out of the system in the event of its failure; such settings would have to be changed from time to time to follow changes in conditions. For example, assume that the control pressure desired from redundant check valve isolated pilot valves is adjusted from 1,000 psi to 700 psi because of a change in operating conditions. The chokes bypassing the check valves will have to be adjusted very carefully. This is tedious and time consuming.

This apparatus overcomes these problems by providing a control system cooperative with redundant pilot valves or other type of redundant valve actutor for operation of a safety relief valve. It has one advantage in that no settings or adjustments are required in the apparatus. For instance, if the control pressure for the safety relief valve were to be altered over an extremely wide range, it would have no impact on the control system disclosed herein. Moreover, it does not require serial manifolding construction in that the control system is relatively easy to install. Another feature of note is that fabrication is relatively inexpensive. There are no settings or adjustments in the apparatus. Once installed, the operating conditions for the pilot valves and the safety relief valve can vary over any desired range without requiring any changes to the control system that interconnects them. Of course, pressure differential changes can be intentionally set.

BRIEF SUMMARY OF THE DISCLOSED APPARATUS

This apparatus is directed to a control system for a safety relief valve, and more particularly, one which accommodates redundant pilot valves. Each pilot valve forms an output or control signal which is input to the control system. The control system has a preferred form of a rectangular assembly having internal passages manifolding several pilot valves. Line pressure is input to each pilot valve. Each pilot forms control pressure signals, all of which are connected to a common line. If any control pressure signal drops, this alters the operative state of the safety relief valve.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED EMBODIMENT

Figure 1:
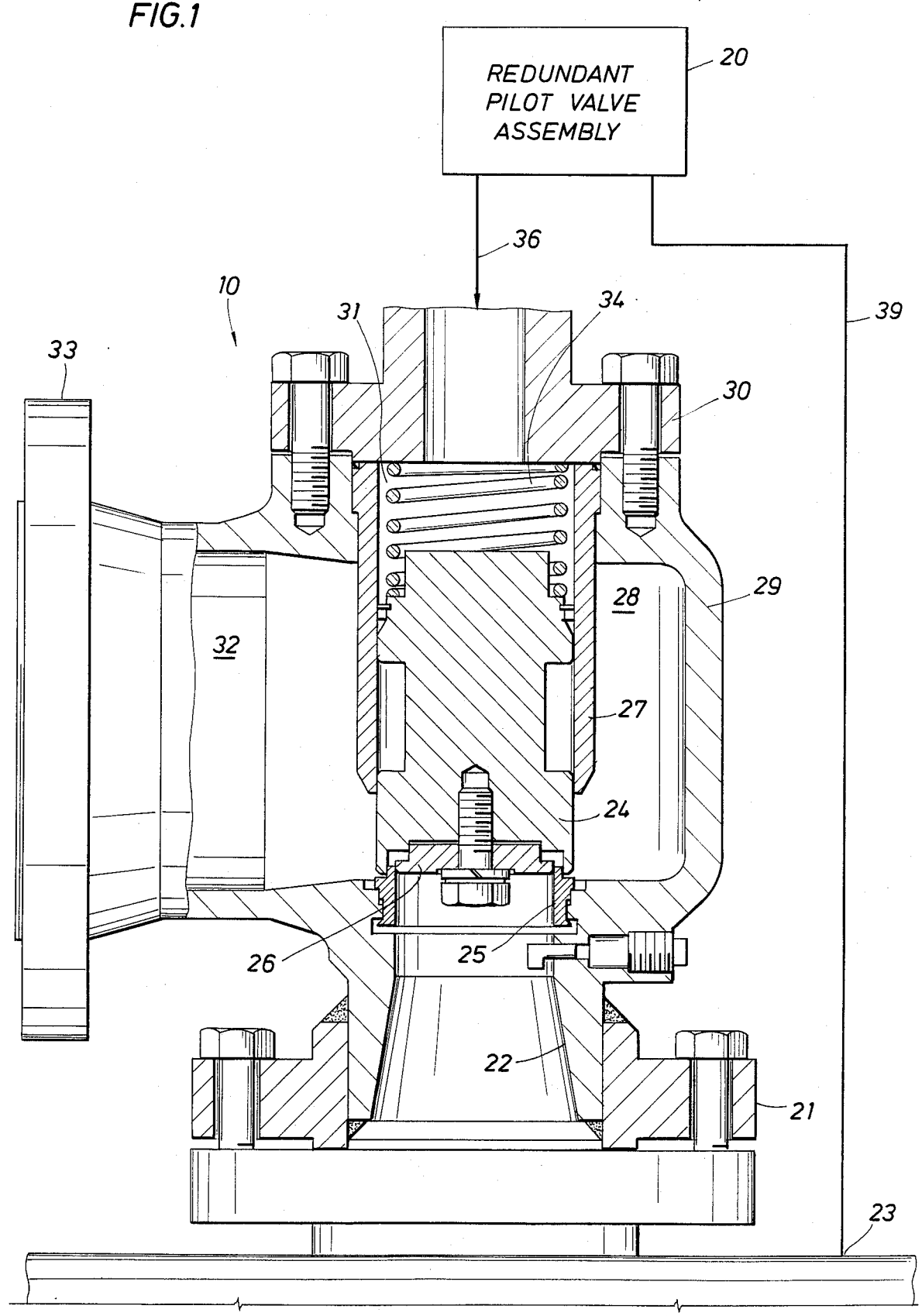
FIG. 1 is a system schematic setting forth a safety relief valve subjected to control by the control system of this disclosure including redundant pilot valves.

Attention is first directed to FIG. 1 of the drawings where a safety relief valve 10 is illustrated in sectional view. Its operation will be described first. Its operation is subject to control by means of two or more redundant pilot valves. The redundant pilot valve control system 20 will be described in detail on referring to FIG. 2 of the drawings. However, the context of its use and application is more readily apparent after an examination of the safety relief valve 10.

An exemplary safety relief valve 10 is set forth. It has a flange 21 surrounding an inlet 22. The inlet receives line pressure. The term line pressure refers to the pressure of the media which is being regulated by the safety relief valve 10. Line pressure is made available to the pilot valve control system 20 through a port formed in the pressure vessel at 23, and a suitable supply line 39 which is connected from there to the control system 20. This operates the pilot valves on line pressure.

The safety relief valve includes a piston body 24. The piston body closes against a seat 25. The seat is in the form of an annular assembly, and a differential area is defined in the throat of the valve seat assembly. This differential area is covered by the wear disk 26. This is the smaller area for the piston 24.

The piston is guided by a surrounding cylindrical skirt 27. It is received within a hollow chamber 28, the chamber being defined by the valve body 29. The sleeve 27 is inserted from the top and is closed over by means of a flange 30. The flange 30 is above the piston 24. It defines a dome area at the top face of the piston 24. The dome area is identified by the numeral 31. The cross-sectional area of the top face of the piston 24 is larger than the cross-sectional area in the throat of the valve seat assembly defined by the wear disk 26. If equal pressures are applied to the two areas, there is a positive closing force. The pressure applied to the top face of the piston 24 is referred to as the dome pressure. It is also described as the control pressure. As can be understood, the ratio of the two areas is subject to variation with the dimensions of the valve as it is manufactured. When the valve 10 opens, the line presusre is relieved by flowing past the piston 24. It flows into the chamber 28 and through a downstream outlet 32. This is connected with a suitable vent pipe at a flange connection 33.

In ordinary operation, the safety relief valve is held closed by equal pressure being applied at the valve inlet 22 and in the dome area 31. The closed position is shown in FIG. 1. A full open position is achieved when the piston 24 is forced some distance from the valve seat 25. It is closed by imposition of dome pressure above the piston. It is opened by a reduction of dome pressure.

A shipping spring 34 is illustrated in FIG. 1 and is included primarily for shipping purposes. The spring can be ordinarily removed inasmuch as the forces created on the piston are quite large, and the force of the spring 34 is relatively insignificant. The safety relief valve 10 is, therefore, operated by means of a control pressure supplied by the control system 20 over the inlet line 36. The line 36, in a single pilot valve installation, is simply connected to the pilot valve control pressure port. In this embodiment, the device works quite differently. The control system 20 includes multiple redundant pilot valves connected to control the safety relief valve.

Figure 5:
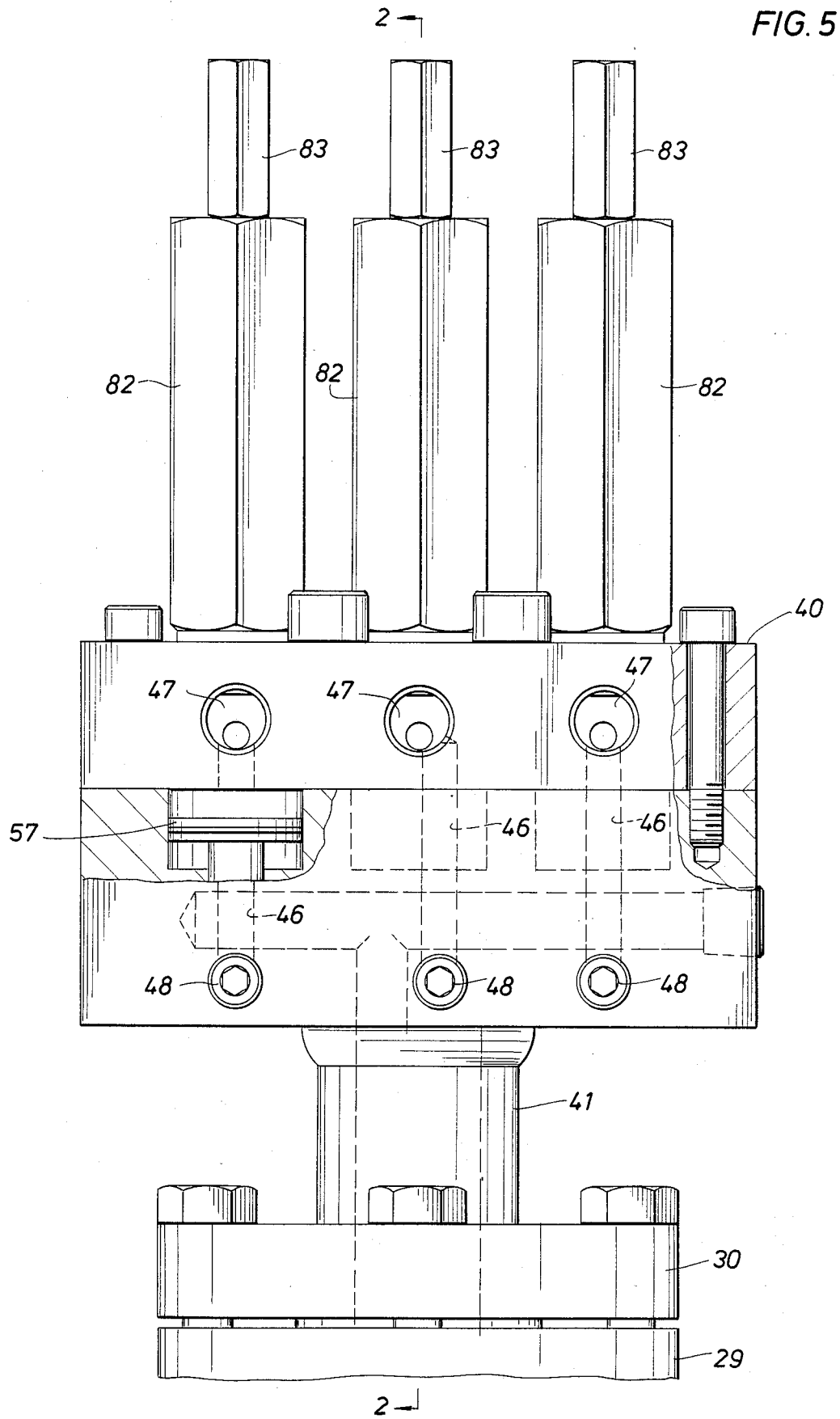
FIG. 5 is a partially broken away elevational view of the redundant pilot valve assembly.

Attention is next directed to FIG. 5 of the drawings where the redundant pilot valve assembly 20 is shown. This device incorporates a rectangular body 40. The body 40 supports a specified number of redundant pilot valves. The body 40 is supported on a downwardly dependent connective stub 41 terminating at the flange 30 for connection to the valve body 29. The body 40 supports several pilot valves. Two or more can be included in the body 40. Since they are duplicated, only one is illustrated in detail in FIG. 2. Transverse passages in the body 40 enable connection of the several pilot valves to a common passage for transmitting control pressure signals to the safety relief valve 10.

Figure 2:
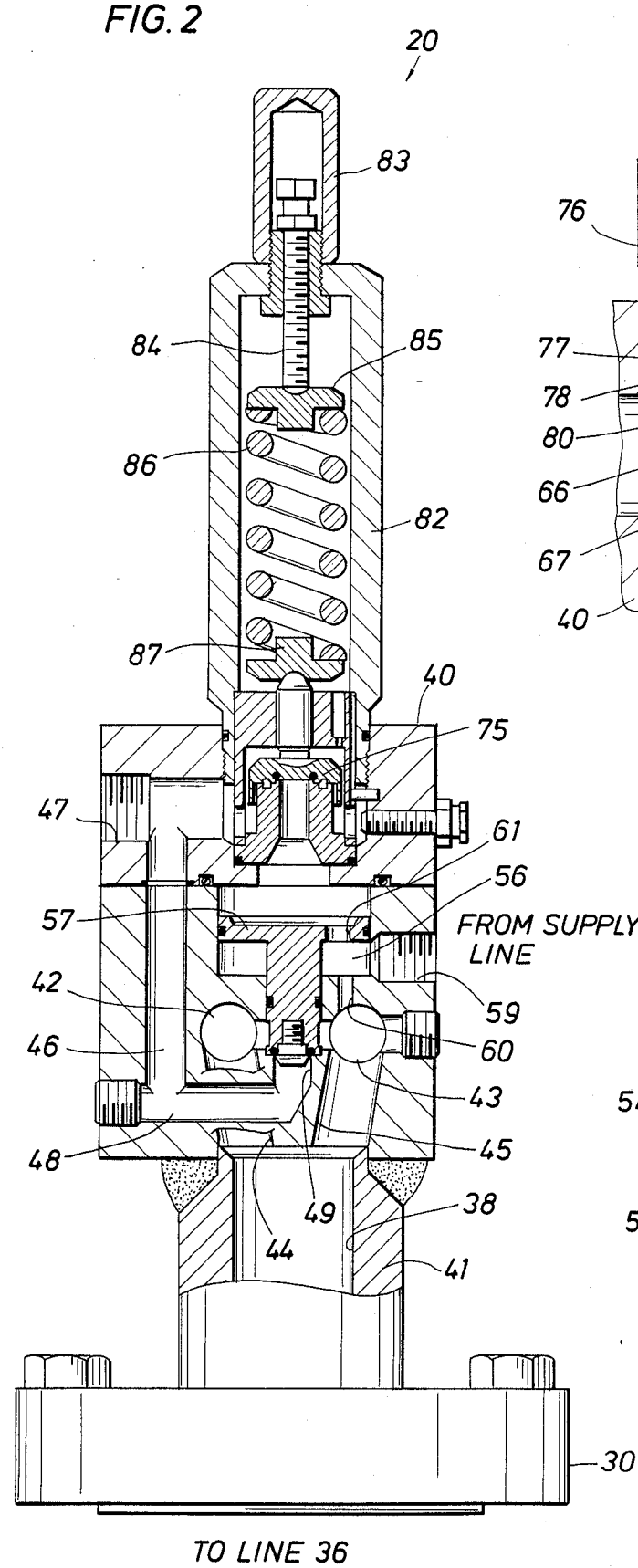
FIG. 2 is a sectional view through the body of the control system of this disclosure showing internal details of construction of a pilot valve.

Referring now to FIG. 2 of the drawings, the redundant pilot valve assembly 20 is shown in sectional view. The body 40 is supported on the connective stub 41 which includes an axial passage 38 extending therethrough. The passage 38 is schematically represented by the line 36 shown in FIG. 1. Dome presusre for control of the valve 10 is supplied to the dome area 31 via the passage 38. The pressure control signal is input to the valve 10 through the contruction shown in FIG. 2.

The body 40 is drilled with duplicate passages along its length which are identified by the numerals 42 and 43. They connect downwardly to separate connective passages 44 and 45 to output redundant paths for the control pressure supplied to the dome area 31. The downwardly directed converging passages 44 and 45 terminate in a common area so that the output control pressure supplied to the dome area 31 is provided by either route in the event of catastrophic failure, exemplified by plugging of one of the passages.

Figure 4:
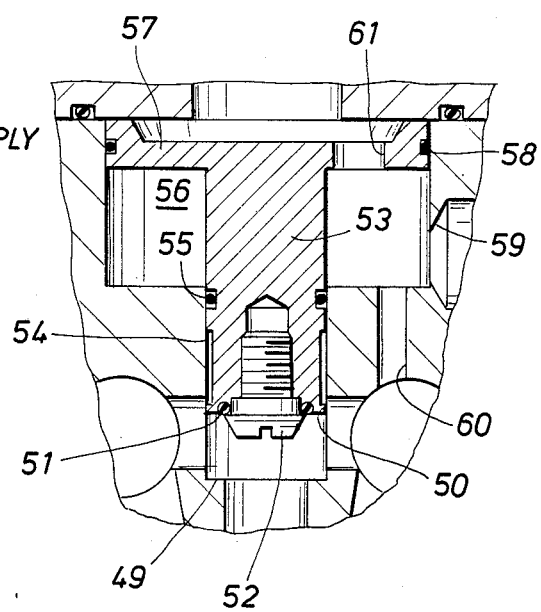
FIG. 4 is an enlarged sectional view of details of the structure showing venting valve operation.

Separately, a vent discharge passage 46 is included for each pilot valve. The passage 46 travels upwardly to the threaded opening 47. This exposes vent flow to an outlet line connected conveniently at the tapped opening 47. A horizontal passage 48 is included to continue the vent passage 46. The passage 48 opens to a valve seat 49. The valve seat comprises an upwardly facing seat area. It is an encircling shoulder confronting a movable valve element. As shown in FIG. 4, the valve seat 49 selectively supports a movable valve 50. The valve 50 inscribes a specified area which is opposed by a larger cross-sectional area acting on the valve 50. Sealing at the seat 49 is accomplished by an O-ring 51 which is held in position by a valve bolt 52. The bolt 52 secures the O-ring in position to assure that the O-ring seals against the seat 49, thereby accomplishing sealing.

The valve 50 includes a relatively long valve stem 53. The valve stem 53 is received in a drilled passage 54. The passage 54 is sealed relative to the valve stem 53 by the O-ring 55 in the groove around the stem. In the down position, the valve 50 closes against the valve seat 49; in the position illustrated in FIG. 4, the valve 50 is open and defines a flow path which will be described in detail. Briefly, the flow path directs flow out to the vent line through the tapped opening 47 shown in FIG. 2.

For the sake of convenience, the elongate body 40 is formed of two members. It is divided into upper and lower halves and the two halves are joined together by suitable vertically deployed bolts, shown in FIG. 5, which pull the two bodies snugly together. The two bodies are sealed against one another by suitable flat gaskets or O-rings placed between the two bodies about each of the pilot valves. The lower body portion is drilled with a relatively large hole defining a chamber 56 shown in FIG. 4. The chamber supports and receives a large transverse, circular piston 57. It has a surrounding skirt at the periphery, the skirt being grooved on the outer face to receive an O-ring 58. This seals against the surrounding cylindrical wall. The chamber 56 is connected with the supply line 39 by the drilled hole 59. The hole 59 opens into the chamber 56 from the exterior, and is shown to be internally threaded in FIG. 2. This enables the supply line 39 to be connected by suitable threaded fittings. The supply line 39 extends to a tapped opening formed in the pressure vessel at 23 shown in FIG. 1. This furnishes line pressure into the chamber 56.

Line pressure introduced into the chamber 56 from the supply source optionally flows downwardly through the drilled hole 60. The hole 60 opens from the chamber 56 downwardly into the redundant passage 43. The drilled hole 60 thus directs line pressure to the dome area 31 in ordinary circumstances. This pressure is changed or adjusted by operation of the equipment as will be described. Line pressure is not only directed through the chamber 56 into the dome area 31, it is also directed upwardly through a hole 61 through the piston 57. This introduces line pressure upwardly for valving action by the pilot valve.

Whether the valve 50 is open or closed (contrast FIGS. 2 & 4), line pressure flows upwardly past the piston 57. As it flows past the piston 57 it is admitted to the remaining apparatus for pilot valve operation.

Figure 3:
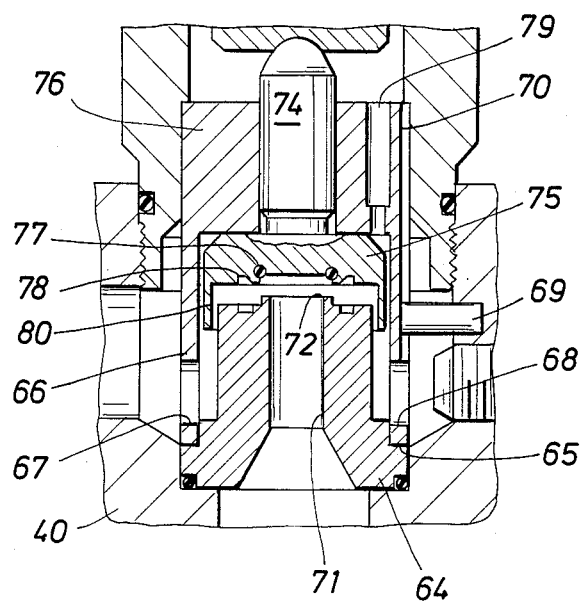
FIG. 3 is an enlarged sectional view of details of the structure of FIG. 2.

Going now to FIG. 3 of the drawings, it will be observed that the body 40 receives a nozzle asembly 64. The nozzle assembly 64 is a spool shaped device which is axially hollow. Around the outside edge, it supports suitable seals. The spool comprising the nozzle assembly includes an external shoulder 65 to receive and align an external sleeve 66. The sleeve 66 is free to rotate. It includes diametrically opposite holes 67 and 68 which are guided into the correct azimuthal location by a guide pin 69 cooperative with a lengthwise groove 70 cut in the sleeve 66. That is the sleeve 66 is rotated until it aligns the groove with the guide pin. Alignment is achieved by the groove 70. The nozzle assembly 64 includes the internal passage 71. The passage 71 directs line pressure upwardly for additional valving action. The nozzle assembly 64 has a surrounding lip 72 which defines the valve seat. Flow is normally upward through the passage 71 to the surrounding lip 72 and is able to disperse beyond the lip 72.

While the lip 72 functions as the valve seat, the valve element is defined by the movable component thereabove identified by the numeral 75. The valve element 75 is mounted on a supportive stem 74 received in a guide body 76. The guide body 76 is appended at the upper end of the sleeve 66. Conveniently, the two are fabricated of single piece construction and the stem 74 is received axially internally of the guide body 76. In contrast between FIGS. 2 and 3, the stem 74 is able to move upwardly in FIG. 3 through a limited range of travel to thereby open the valve element 75 from the valve seat 72 which faces it. The valve element 75 is grooved to receive an O-ring 77. The O-ring cooperates with the valve seat 72 to consummate a complete seal. The guide body 76 is drilled at 79 to provide a flow passage thereabove.

The valve element 75 incorporates a surrounding skirt 80. The skirt 80 directs flow downwardly and on the inside of the surrounding sleeve 66. Flow is then permitted to escape through the holes 67 and 68 out toward the vent 47. The flow route is better understood on viewing the enlargement of FIG. 3. The supply line delivers high pressure fluid up through the passage 71 and past the valve seat 72. If the valve element 75 is closed, there is no flow, the O-ring 77 perfecting a seal against the facing valve seat 72. Conversely, if the valve element 75 is open as shown in FIG. 3, the high pressure fluid flows past the valve seat 72 and downwardly into the area where the holes 67 and 68 are located by the sleeve 66 and out through the vent passage 47.

Going now to the FIG. 2 drawing, the numeral 82 identifies an upstanding bonnet. The bonnet is covered over at the top by a cap 83 which encloses a threaded bolt 84. The bolt can be adjusted in position in a conventional manner. It drives a disk 85 acting against a compressed spring 86. The spring 86 bears against a disc 87 which bears against the stem 74 to force the valve element 75 to the closed position. That is, the position shown in FIG. 2 is the normal or closed position of the pilot valve. The force imparted by the spring 86 is adjustable. When closed, there is no flow past the valve element 75. The bonnet 82 threads to the upper body portion of the body 40.

As mentioned before, there are multiple pilot valves, each configured as described above and shown in FIG. 2. Conveniently, each can be provided with a separate supply line input at 59 for connection with a separate supply line 39 extending from the pressure vessel to each of the pilot valves. Each can be separately provided with a vent line connected at 47. Alternately, external manifolding (not shown) can connect the several vents in parallel, and the several supply line inputs can be connected in parallel, this being within the discretion of the installer.

OPERATION OF A SINGLE PILOT VALVE

Operation of the device is described in segments. First of all, assume that the tapped supply connection 59 is provided with supply line pressure. That pressure flows upwardly from the opening at 59 through the drilled hole 61 in the piston 57 to the valve seat 72 and is regulated by the valve element 75. The valve element 75 may be closed. That is, the setting on the spring 86 may be greater than the force generated by the supply line pressure so that the valve element 75 is not able to open. If so, there is no flow past the valve seat 72. In this instance, the components are in the downward position illustrated in FIG. 2. By contrast, they are in the full open position shown in FIG. 3. That is, the valve element 75 is forced to the full pen position by the supply line pressure. This compresses the spring 86, and is indicative of the fact that the force acting on the valve element 75 is sufficient to move the valve element 75 to the maximum amount opening permitted. The valve element 75 is forced back toward the valve seat 72 in a manner described in U.S. Pat. No. 3,411,530 to Powell, the inventor of the present disclosure.

OPERATION OF THE VALVE 50

The valve 50 is shown in FIGS. 2 and 4. In FIG. 2, it is in the closed position. When closed, it prevents the flow of supply line pressure input from the supply line 39 into the vent opening 47. When it is closed, the transverse passages 42 and 43 (crossed connected at the valve seat) have a common pressure. Under static conditions, the pressure in the transverse passages 42 and 43 in the same as the supply line pressure input at 59.

When the valve 50 is open, the flow route is past the valve 50, the valve seat 49, and through the passages 48 and 46 to the tapped opening 47. As this flow occurs, control pressure is reduced in the dome area 31 via the connective passages 44 and 45 causing the piston 24 to move upward and thereby permitting flow through the valve 10.

Operation of the valve 50 should be considered. It is moved by pressures acting on different surface areas. That is, there is an area differential. Ordinarily, the valve 50 is biased to the closed position against the seat 49. Closure is accomplished by the supply line pressure input at 59 and acting on the piston 57. The supply line pressure enters the chamber 56 and is transmitted to the dome area 31 via the passage 60 and connective passages 44 and 45. The supply line pressure is also transmitted to the area above the piston 57 and to the valve element 75 via the passage 61. Because there is an area differential between the upper and lower exposed surfaces of the piston 57 (the upper surface presenting the larger of the two areas) the supply line pressure acting on the piston 57 forces the valve 50 in seating engagement with the seat 49 as shown in FIG. 2.

The passages 60 and 61 are sized for directing line pressure. The passage 60 is smaller than the passage 61 and restricts or limits the rate at which supply line pressure is supplied to the dome area 31. The passage 60 is also sized relative to the passage 61 so that the passage 60 restricts recharging of the passages 44 and 45 upon opening of the valve 50. When the valve 50 is open, supply line pressure tends to flow through the larger passage 61 and is vented through the vent opening 47 via the nozzle assembly 64. The smaller passage 60 provides a restriction to flow and therefore limits recharging of the passages 44 and 45 when the valve 50 is open.

When the supply line pressure exceeds the set pressure of the valve element 75, the valve element 75 is forced upwardly as shown in FIG. 3, thereby permitting the pressure in the area above the piston 57 to be vented through holes 67 and 68 via the inlet passage 71 of the nozzle assembly 64. As flow develops past the valve seat 72, fluid pressure above the piston 57 is reduced to less than the pressure below the piston 57 in the chamber 56. Thus, a positive force in the upward direction is created forcing the piston 57 to move upward and thereby overcoming the closing forces at the seat 49 to open the valve 50. The valve 50 moves between extreme positions, one being fully open and the other being fully closed.

When the valve 50 is opened, the dome area 31 is depressurized via the connective passages 44 and 45 which communicate with the vent passages 46 and 48 through the open valve 50. Depressurization of the dome area 31 results in the opening of the safety relief valve 10.

Closure is accomplished when the predetermined system blow down pressure is reached and the supply line pressure acting on the pilot valve element 75 is reduced, resulting in closure of the valve element 75 as described in greater detail in U.S. Pat. No. 3,411,530. Closure of the valve 75 results in pressurization of the area above the piston 57, thereby forcing the valve 50 in seating engagement with the valve seat 49. The supply line pressure is again directed to the dome area 31 via the passages 60 and 45 forcing the piston 24 downward and thereby closing the valve 10.

OPERATION OF MULTIPLE PILOT VALVES

Keep in view of the fact that there are several redundant pilot valves, at least two. The redundant multiple pilot valves are connected with the following common connections. All of the redundant pilot valves share the passages 42 and 43 through the valve body 40. These are connected in common to all pilot valves. The passages 42 and 43 provide redundant branches 44 and 45 extending downwardly in fluid communication with the dome area 31 through the passage 38 extending through the connective stub 41. Should any pilot valve fail, it will typically tend to fail by closing. If one or more close and all but one do close, the redundant system is still able to operate. Each pilot has its own individual vent line at 47. Each pilot valve has its own individual pressure supply line 39 extending from the pressure vessel. Whether there is external common vent manifolding or not, they all operate individually in this regard. Each can be individually set, and they are presumably set at the same pressure levels, this being accomplished by individual adjustment of the respective springs 86. It is understood, however, that this disclosure is not limited solely to the utilization of pilot valves mounted to the valve body 40. Other types of presure responsive valve actuators, for example, diaphragm or solenoid operated valve actuators, may be used in the control system of the present disclosure.

While the foregoing is directed to the preferred embodiment of the present invention, other and further embodiments of the invention may be devised without departing from the basic concept thereof, and the scope thereof is determined by the claims which follow.

What is claimed is:

1. A control system for controlling opening and closing of pressure actuated apparatus subject to a control pressure from the control system, which control pressure is responsive to line pressure furnished to the control system and the pressure actuated apparatus, the control system comprising:
   (a) a valve housing including at least one inlet passage in fluid communication with the line pressure and an outlet passage in fluid communication with the pressure actuated apparatus;
   (b) at least two redundant valve actuators in fluid communication with said valve housing, each of said valve actuators forming control pressure supplied to the pressure actuated apparatus;
   (c) means establishing fluid communication between each of said valve actuators and said outlet passage for forming a single output control pressure supplied to the pressure actuated apparatus for operation thereof; and
   (d) wherein said valve housing includes, for each redundant valve actuator,
      (1) a chamber having a piston therein with separate, opposing, different sized areas;
      (2) means for introducing line pressure against the smaller of the different sized areas; and
      (3) means for introducing line pressure against the larger of the different sized areas of said piston.

2. The apparatus of claim 1 wherein said valve housing includes redundant, interconnected internal passages therein in fluid communication with each of said valve actuators and wherein said redundant passages connect commonly to said outlet passage in said valve housing to supply said output control pressure to the pressure actuated apparatus.

3. The apparatus of claim 2 wherein each of said valve actuators includes first valve means opening line pressure to vent through a vent opening means, and second valve means located in said valve housing opening line pressure to vent through said vent opening means to adjust control pressure to a pressure less than line pressure.

4. The apparatus of claim 3 including separate vent outlet means in said valve housing for each of said valve actuators.

5. The apparatus of claim 3 wherein said second valve means comprises said chamber formed in said valve housing having said piston positioned therein with separate, opposing, different sized areas, said piston including a valve stem extending from the smaller of the different sized areas, said valve stem terminating at a valve surface for sealing engagement with a valve seat formed in said valve housing.

6. The apparatus of claim 5 wherein said valve housing includes separate chambers in fluid communication with each of said valve actuators, said chambers being interconnected by said redundant internal passages in said valve housing.

7. A control system for controlling opening and closing of a safety relief valve subject to a control pressure from the control system as determined by the operative state of redundant pilot valves responsive to line pressure furnished to the pilot valves and to the safety relief valve, the control system comprising:
   (a) a valve housing having redundant, interconnected internal passages;
   (b) at least two redundant pilot valves in fluid communication with said internal passages, each of said pilot valves forming control pressure;

(c) wherein said internal passages are connected to each of said redundant pilot valves to form a single output control pressure, said internal passages connecting commonly to an outlet passage in said valve housing to supply said output control pressure to a safety relief valve for operation thereof; and (d) wherein said valve housing includes, for each pilot valve,
  (1) a chamber having a piston therein with separate, opposing, different sized areas;
  (2) means for introducing line pressure against the smaller of the different sized areas; and
  (3) means for introducing line pressure against the larger of the different sized areas of said piston.

8. The apparatus of claim 7 wherein each of said pilot valves includes first valve means opening line pressure to vent through a vent opening means, and second valve means located in said valve housing opening line pressure to vent through said vent opening means to adjust control pressure to a pressure less than line pressure, said valve housing including separate vent outlet means for each of said pilot valves.

9. The apparatus of claim 7 wherein the control pressure is dynamically supplied to the safety relief valve through restriction means in said valve housing.

10. The apparatus of claim 9 wherein said restriction means comprises a passage connecting said chamber with said redundant internal passages.

11. The apparatus of claim 10 wherein said restriction is sized to limit the rate at which control pressure is supplied to the safety relief valve.

12. The apparatus of claim 11 wherein said restriction means is further sized to restrict recharging of said redundant internal passages upon opening of valve means to vent control pressure through vent opening means in said valve housing.

13. The apparatus of claim 7 wherein said chamber is connected through valve means to a vent outlet.

14. The apparatus of claim 13 wherein said valve means is adjustably biased by a bias means.

15. The apparatus of claim 13 wherein said valve means includes said piston received in said chamber, said piston including a valve stem extending therefrom and terminating at a valve surface for sealing engagement with a valve seat formed in said valve housing.

16. The apparatus of claim 14 wherein said valve means connects between line pressure inlet means and a vent outlet, said valve means controllably venting on overcoming said bias means.

17. The apparatus of claim 7 wherein said valve housing includes separate chambers in fluid communication with each of said pilot valves, said chambers being interconnected by said redundant internal passages in said valve housing.

18. The apparatus of claim 5 wherein said piston includes a hole extending therethrough for introducing line pressure against the larger of the different sized areas of said piston and simultaneously supplying line pressure to said valve actuator.

19. The apparatus of claim 5 wherein the control pressure is dynamically supplied to said valve actuators and to said pressure actuated apparatus, the control pressure being supplied to said pressure actuated apparatus through a passage connecting said chamber with said redundant internal passages and to said valve actuators through a hole in said piston, said passage being smaller than said hole and sized relative to said hole for limiting the rate at which control pressure is supplied to the pressure actuated apparatus and restricting recharging of said redundant internal passages upon opening of valve means in said valve body to vent control pressure through a vent opening means.

* * * * *